US007962528B1

(12) United States Patent
Pasupathy et al.

(10) Patent No.: US 7,962,528 B1
(45) Date of Patent: *Jun. 14, 2011

(54) SYSTEM AND METHOD FOR QUICKLY DETERMINING CHANGED METADATA USING PERSISTENT CONSISTENCY POINT IMAGE DIFFERENCING

(75) Inventors: Shankar Pasupathy, Sunnyvale, CA (US); Vijayan Prabhakaran, Madison, WI (US); Garth Richard Goodson, Fremont, CA (US); Steven R. Kleiman, Los Altos, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/707,722

(22) Filed: Feb. 18, 2010

Related U.S. Application Data

(63) Continuation of application No. 11/324,429, filed on Jan. 3, 2006, now Pat. No. 7,693,864.

(51) Int. Cl.
*G06F 7/00* (2006.01)

(52) U.S. Cl. ......... 707/803; 707/822; 711/111; 711/154

(58) Field of Classification Search ........... 707/999.102, 707/999.2, 802, 803, 822; 711/100, 111, 711/154
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,570,217 A | 2/1986 | Allen et al. | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,124,987 A | 6/1992 | Milligan et al. | |
| RE34,100 E | 10/1992 | Hartness | |
| 5,155,835 A | 10/1992 | Belsan | |
| 5,163,131 A | 11/1992 | Row et al. | |
| 5,202,979 A | 4/1993 | Hillis et al. | |
| 5,278,979 A | 1/1994 | Foster et al. | |

(Continued)

FOREIGN PATENT DOCUMENTS

WO    WO 89/10594    11/1989

OTHER PUBLICATIONS

U.S. Appl. No. 10/421,051, filed Apr. 11, 2003, Rajan et al.

(Continued)

*Primary Examiner* — Hosain T Alam
*Assistant Examiner* — Jieying Tang
(74) *Attorney, Agent, or Firm* — Cesari and McKenna, LLP

(57) ABSTRACT

A system and method accelerates update of a metadata search database using PCPI differencing. After first populating the search database, a search agent generates a PCPI and utilizes a PCPI differencing technique to quickly identify changes between inode files of first and second PCPIs. The differences are noted as modified metadata and are written to a log file, which is later read by the search agent to update the search database.

19 Claims, 11 Drawing Sheets

U.S. PATENT DOCUMENTS

| | | | |
|---|---|---|---|
| 5,426,747 A | 6/1995 | Weinreb et al. | |
| 5,581,724 A | 12/1996 | Belsan et al. | |
| 5,819,292 A | 10/1998 | Hitz et al. | |
| 6,636,879 B1 | 10/2003 | Doucette et al. | |
| 6,732,124 B1* | 5/2004 | Koseki et al. ............... | 707/999.1 |
| 6,993,539 B2 | 1/2006 | Federwisch et al. | |
| 7,107,385 B2 | 9/2006 | Rajan et al. | |
| 7,707,165 B1* | 4/2010 | Jiang et al. ..................... | 707/806 |
| 2002/0083037 A1 | 6/2002 | Lewis et al. | |
| 2003/0041211 A1 | 2/2003 | Merkey et al. | |
| 2003/0070043 A1 | 4/2003 | Merkey | |
| 2003/0158861 A1 | 8/2003 | Sawdon et al. | |
| 2003/0158863 A1 | 8/2003 | Haskin et al. | |
| 2003/0159007 A1 | 8/2003 | Sawdon et al. | |
| 2003/0182313 A1 | 9/2003 | Federwisch et al. | |
| 2003/0182322 A1* | 9/2003 | Manley et al. ................ | 707/201 |
| 2004/0030668 A1 | 2/2004 | Pawlowski et al. | |
| 2004/0030822 A1 | 2/2004 | Rajan et al. | |
| 2005/0144202 A1* | 6/2005 | Chen ............................. | 707/205 |
| 2005/0246401 A1 | 11/2005 | Edwards et al. | |
| 2006/0218135 A1 | 9/2006 | Bisson et al. | |
| 2006/0288026 A1 | 12/2006 | Zayas et al. | |

OTHER PUBLICATIONS

U.S. Appl. No. 10/777,979, filed Feb. 12, 2004, Eng et al.

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14$^{th}$ VLDB Conference, LA, CA 1988.

Chaudhuri, Surajit, et al., *Self-Tuning Technology in Microsoft SQL Server*, Data Engineering Journal 22, Feb. 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John, H. et al., *Scale and Performance in a Distributed File System*, ACM Trans. Computer System, 6(1), Feb. 1988 pp. 51-81.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14( 2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached Worm File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14$^{th}$ VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.
Isomaki, Markus, *Differentiated Service for the Internet*, Department of Technical Physics and Mathematics, May 9, 1998.
Kazar, Michael L., et al., *Decorum File System Architectural Overview*, USENIX Summer Conference, Anaheim, California, 1990.
Lorie, Raymond, A, *Physical integrity in a large segmented database*, ACM Trans. Database Systems, (2)1: 91-104, Mar. 1977.
Lorie, RA, *Shadow Page Mechanism*, IBM Technical Disclosure Bulletin, Jun. 1986, pp. 340-342.
McKusick, Marshall Kirk, et al., *A Fast File System for UNIX*, Computer Science Division, Department of Electrical Engineering and Computer Sciences, Univ. of CA, Berkley, Feb. 18, 1994.
Miller, Ethan L., et al., *RAMA:A File System for Massively Parallel Computers*, 12$^{th}$ IEEE Symposium on Mass Storage Systems, Monterey CA, Apr. 1993, pp. 163-168.
Moons, Herman et al., *Location-Independent Object Invocation in Open Distributed Systems*, Autumn 1991 EurOpen Technical Conference and Exhibition, pp. 287-300 (Sep. 16-20, 1991).
Morris, James H., et al, *Andrew: A Distributed Personal Computing Environment*, Comm. of the ACM, vol. 29, Mar. 1986, pp. 184-201.
Mullender, Sape J., et al., *A distributed file service based on optimistic concurrency control*, ACM Symposium on Operating System Principles (Orcas Island, Washington). Published as Operating Systems Review, 19(5):51-62, Dec. 1985.
Muller, Keith, et al., *A High Performance Multi-Structured File System Design*, In Proceedings of the 13th ACM Symposium on Operating Systems Principles, Oct. 1991, pp. 56-67.
Moons, Herman et al., *Location-Independent Object Invocation in Open Distributed Systems*, Autumn 1991 EurOpen Technical Conference and Exhibition, pp. 287-300 (Sep. 16-20, 1991).
Morris, James H., et al, *Andrew: A Distributed Personal Computing Environment*, Comm. of the ACM, vol. 29, Mar. 1986, pp. 184-201.
Mullender, Sape J., et al., *A distributed file service based on optimistic concurrency control*, ACM Symposium on Operating System Principles (Orcas Island, Washington). Published as Operating Systems Review, 19(5):51-62, Dec. 1985.
Muller, Keith, et al., *A High Performance Multi-Structured File System Design*, In Proceedings of the 13th ACM Symposium on Operating Systems Principles, Oct. 1991, pp. 56-67.
Ousterhout, John K. et al., *The Sprite Network Operating System*, Computer Science Division, Department of Electrical Engineering and Computer Sciences, Univ. of CA, Berkley, Nov. 19, 1987.
Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.
Ousterhout, John, *Why Aren't Operating Systems Getting Faster as Fast as Hardware?*, Digital WRL Technical Note TN-11, Oct. 1989.
Ousterhout, John, *A Brief Retrospective On The Sprite Network Operating System*, found at http://www.cs.berkeley.edu/projects/sprite/retrospective.html,visited on Mar. 11, 2005.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).
Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).
Peterson, Zachary Nathaniel Joseph, *Data Placement for Copy-on-Write Using Virtual Contiguity*, University of CA, Santa Cruz, Master of Science in Computer Science Thesis, Sep. 2002.
Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.
Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.
Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.
Rosenblum, Mendel, et al, The *Design and Implementation of a Log-Structured File System* Jul. 24, 1991 pp. 1-15.
Rosenblum, Mendel, et al., *The Design and Implementation of a Log-Structured File System*, , In Proceedings of ACM Transactions on Computer Systems, (10)1:26-52, Feb. 1992.
Sandberg, Russel et al., *Design and implementation of the Sun Network File-system*. In Proc. Summer 1985 USENIX Conf., pp. 119-130, Portland OR (USA), Jun. 1985.
Santry, Douglas S., et al., *Deciding When to Forget in the Elephant File System*, Operating Systems Review, 34(5), (Dec. 1999) pp. 110-123.
Satyanarayanan, M., et al., *The ITC Distributed File System: Principles and Design*, In Proceedings of the 10th ACM Symposium on Operating Systems Principles, (19)5:56-67, Dec. 1985.
Satyanarayanan,.M.. *A survey of distributed file-systems*. Annual Review of Computing Science, 4(73-104), 1989.
Satyanarayanan, M., et al, *Coda: A highly available file system for a distributed workstation environment*. IEEE Transactions on Computers, 39(4):447-459, 1990.
Satyanarayanan, Mahadev, *Scalable, Secure, and Highly Available Distributed File Access*, Computer May 1990: 9-21.
Sidebotham, Bob, *Volumes: The Andrew File System Data Structuring Primitive*, EEUG Conference Proceedings, Manchester, UK, Autumn 1986.
User Guide found at http://www.openafs.org/pages/doc/UserGuide/auusg004.htm, visited on Mar. 2, 2005.
Welch, Brent B., et al., *Pseudo Devices: User-Level Extensions to the Sprite File System*, Computer Science Division, Department of Electrical Engineering and Computer Sciences, Univ. of CA, Berkley, Apr. 1988.
Welch, Brent B., et al., *Pseudo-File-Systems*, Computer Science Division, Department of Electrical Engineering and Computer Sciences, Univ. of CA, Berkley, Oct. 1989.
Wittle, Mark, et al, *LADDIS: The next generation in NFS file server bench-marking*, USENIX Association Conference Proceedings, Apr. 1993.
Kazar, Michael L., Synchronization and Caching Issues in the Andrew File System, Carnegie Mellon University, CMU-ITC-88-063, 12 pages, Jun. 1988.
Howard, John H., An Overview of the Andrew File System, Carnegie Mellon University, CMU-ITC-88-062 1988, 6 pages, 1988.
The IBM System/38, Chapter 8, pp. 137-15, 1980.
Lomet, David, et al., The performance of a multiversion access method, ACM SIG-MOD International Conference on Management of Data, 19:353-363, 1990.
Satyanarayanan, M., et al., Coda: A highly available file system for a distributed workstation environment Carnegie Mellon University, CMU-ITC, 1989.
U.S. Appl. No. 11/336,021 entitled System and Method for Determining Changes in Two Snapshots and for Transmitting Changes to a Destination Snapshot, filed Jan. 20, 2006 by Michael L. Federwisch.
U.S. Appl. No. 11/324,429 entitled System and Method for Quickly Determining Changed Metadata Using Persistent Consistency Point Image Differencing, filed Jan. 3, 2006 by Shankar Pasupathy.

* cited by examiner

SYSTEM AND METHOD FOR QUICKLY DETERMINING CHANGED METADATA USING PERSISTENT CONSISTENCY POINT IMAGE DIFFERENCING

RELATED APPLICATION

The present application is a continuation of commonly assigned U.S. patent application Ser. No. 11/324,429, which was filed on Jan. 3, 2006, now U.S. Pat. No. 7,693,864 by Shankar Pasupathy for a SYSTEM AND METHOD FOR QUICKLY DETERMINING CHANGED METADATA USING PERSISTENT CONSISTENCY POINT IMAGE DIFFERENCING and is hereby incorporated by reference.

This application is related to the following U.S. Pat. No. 7,562,077, entitled METHOD AND APPARATUS FOR GENERATING AND DESCRIBING BLOCK-LEVEL DIFFERENCE INFORMATION ABOUT TWO SNAPSHOTS, by Timothy Bisson, et al., the contents of which are expressly incorporated herein by reference.

FIELD OF THE INVENTION

The present invention relates to file systems and, more specifically, to rapidly updating a database of metadata relating to a file system using persistent consistency point imaging.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN) and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of data containers, such as directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., of Sunnyvale, Calif.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

Some file systems, including the exemplary WAFL file system described above may implement virtual disks (vdisks), which are encapsulated data containers stored within a file system. An example of such a storage appliance is described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al., the contents of which are hereby incorporated by reference. Similarly, vdisks are described in U.S. Pat. No. 7,107,385, entitled STORAGE VIRTUALIZATION BY LAYERING VIRTUAL DISK OBJECTS ON A FILE SYSTEM, by Vijayan Rajan, et al., the contents of which are hereby incorporated by reference.

Storage system administrators often desire to rapidly obtain information, i.e., metadata, relating to the data containers stored within storage systems. As used herein, metadata denotes the attributes associated with a data container other than the actual data contents of the data container. In addition, data containers may denote a file, a directory, a virtual disk (vdisk), or other data construct that is addressable via a storage system. Examples of metadata relating to a data container that may be of interest include, e.g., file name, file type, file size, modification time, etc. Administrators typically desire fast access to metadata to be able to answer such questions as the identity of the largest files within the storage system, the percentage of files within a storage system that are of a particular type, etc. By quickly determining such information, administrators may more effectively manage storage and permit users to better manage their own storage.

To identify the metadata information desired, an administrator may need to examine all of the data containers within a storage system every time such information is requested. In modern storage systems, which may have the tens or hundreds of millions of data containers, this is clearly not a practical solution. Another solution is to generate a database of metadata associated with the file system to enable faster searching. The metadata database may be constructed by performing a file system "crawl" through the entire file system. As used herein, a file system crawl involves accessing every data container within the file system to obtain the necessary metadata. However, such a file system crawl is expensive both in terms of disk input/output operations and processing time and suffers from the same practical problems of directly accessing each data container. That is, the file system crawl may slow access to the file system for tens of minutes at a time, which results in an unacceptable loss of performance. Additionally, the file system crawl must be performed at regular intervals to maintain an up-to-date metadata database. As a result of the substantial processing time required, a further disadvantage of the file system crawl is that the metadata stored within the database may be inconsistent with the current state of the file system, i.e., the database only represents the metadata as of the completion of the last file system crawl.

SUMMARY OF THE INVENTION

The present invention overcomes the disadvantages of the prior art by providing a system and method for quickly determining changed data containers using persistent consistency point image (PCPI) differencing. The present invention is illustratively directed to providing an accelerated update technique for a metadata search database; however, the technique may be utilized to identify any changed data containers, e.g., files, virtual disks (vdisks), etc. A search agent, which is illustratively a software module executing on a computer operatively interconnected with one or more storage systems, generates and maintains the metadata search database. In a network attached system (NAS) environment, the metadata search database illustratively comprises a database of metadata relating to data containers within a particular volume (or file system) associated with each storage system. Alternately, in a storage area network (SAN) environment, the search database comprises a database of metadata relating to data containers stored within a file system overlaid onto an exported logical unit number (lun) stored within the storage system. In either case, the metadata search database may be queried by clients of each storage system Specifically, in the example of the NAS environment, the search agent first initiates generation of a PCPI of the file system. The search agent then serially reads the inode file, which is included within the PCPI, to initially populate the search database. At regular intervals thereafter, the search agent initiates generation of another PCPI of the volume. Notably, the search agent utilizes a PCPI differencing technique to quickly identify any changes in the metadata associated with inodes stored within the volume. Any identified changes are written to a log file stored on the storage system. Once the differencing technique has completed, the search agent reads the log file and updates the search database, thereby moving the search database to a consistent state with the file system.

In the example of the SAN environment, the search agent first causes the storage system to generate a PCPI of the volume storing the exported lun. Illustratively, the exported lun has New Technology File System (NFTS) overlaid thereon by a client of the storage system. The search agent performs an initial analysis of the contents of the exported lun by accessing the exported lun via a file level protocol available through the storage system. The search agent reads the records stored within a master file table (MFT) of a client file system and populates the search database with the metadata stored within the various records. At regular intervals thereafter, the search agent initiates generation of another PCPI of the volume containing an exported lun. Using the file level protocol, the agent reads the appropriate journal entries stored within the client file system to determine which, if any, journal entries must be replayed to bring the MFT to a consistent state. The search agent then retrieves each record from the MFT and compares a logical sequence number (LSN) stored therein with the LSN stored within the MFT record of the previous PCPI. If both LSNs are identical, then no change in metadata has occurred for the data container associated with the record. However, if the LSNs differ, then metadata has been modified. In such a case, the search agent causes the metadata to been written to a log entry within the log file. Once all of the records within the MFT have been examined, the search agent reads the log file and updates the search database accordingly.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
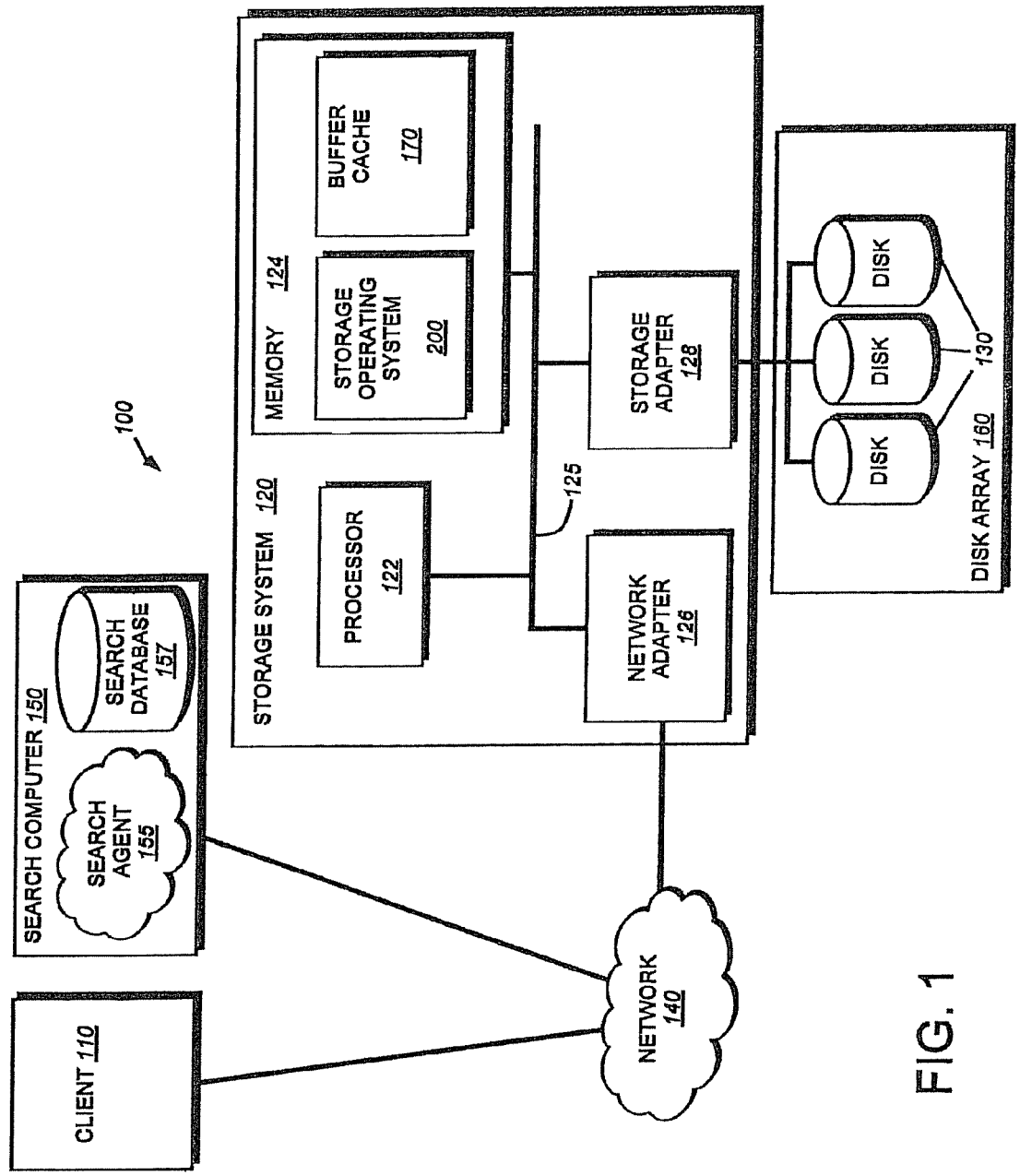
FIG. 1 is a schematic block diagram of an exemplary storage system environment in accordance with an embodiment of the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and virtual disks ("vdisks") on the disks.

In the illustrative embodiment, the memory 124 comprises storage locations that are addressable by the processor and adapters for storing software program code. A portion of the memory may be further organized as a "buffer cache" 170 for storing certain data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications thereon. Moreover, the client 110 may interact with the storage system 120 in accordance with a client/server model of information delivery. That is, the client may request the services of the storage system, and the system may return the results of the services requested by the client, by exchanging packets over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Alternately, the information may be implemented as one or more aggregates comprising of one or more flexible (virtual) volumes. Aggregates and flexible volumes are described in detail in U.S. Pat. No. 7,409,494, entitled EXTENSION OF WRITE ANYWHERE FILE SYSTEM LAYOUT, by John K. Edwards, et al, the contents of which are hereby incorporated by reference.

The disks within the file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Also connected to the network 140 is a search computer 150. The search computer 150 may utilize any form of operating system and includes a novel search agent 155. The search agent 155, described further below, updates and maintains a search database 157 of metadata associated with data containers stored on the storage system 120. In the illustrative embodiment, the search computer 150 is a separate computer connected to the network 140. However, in alternate embodiments, the search agent 155 and search database 157 may be integrated with a client 110 or with the storage system 120 itself. As such, the description of the search agent 155 executing on a search computer 150 should be taken as exemplary only.

B. Storage Operating System

To facilitate access to the disks 130, the storage operating system 200 illustratively implements a write-anywhere file system that cooperates with virtualization modules to "virtualize" the storage space provided by disks 130. The file system logically organizes the information as a hierarchical structure of named data containers, e.g., directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 2:
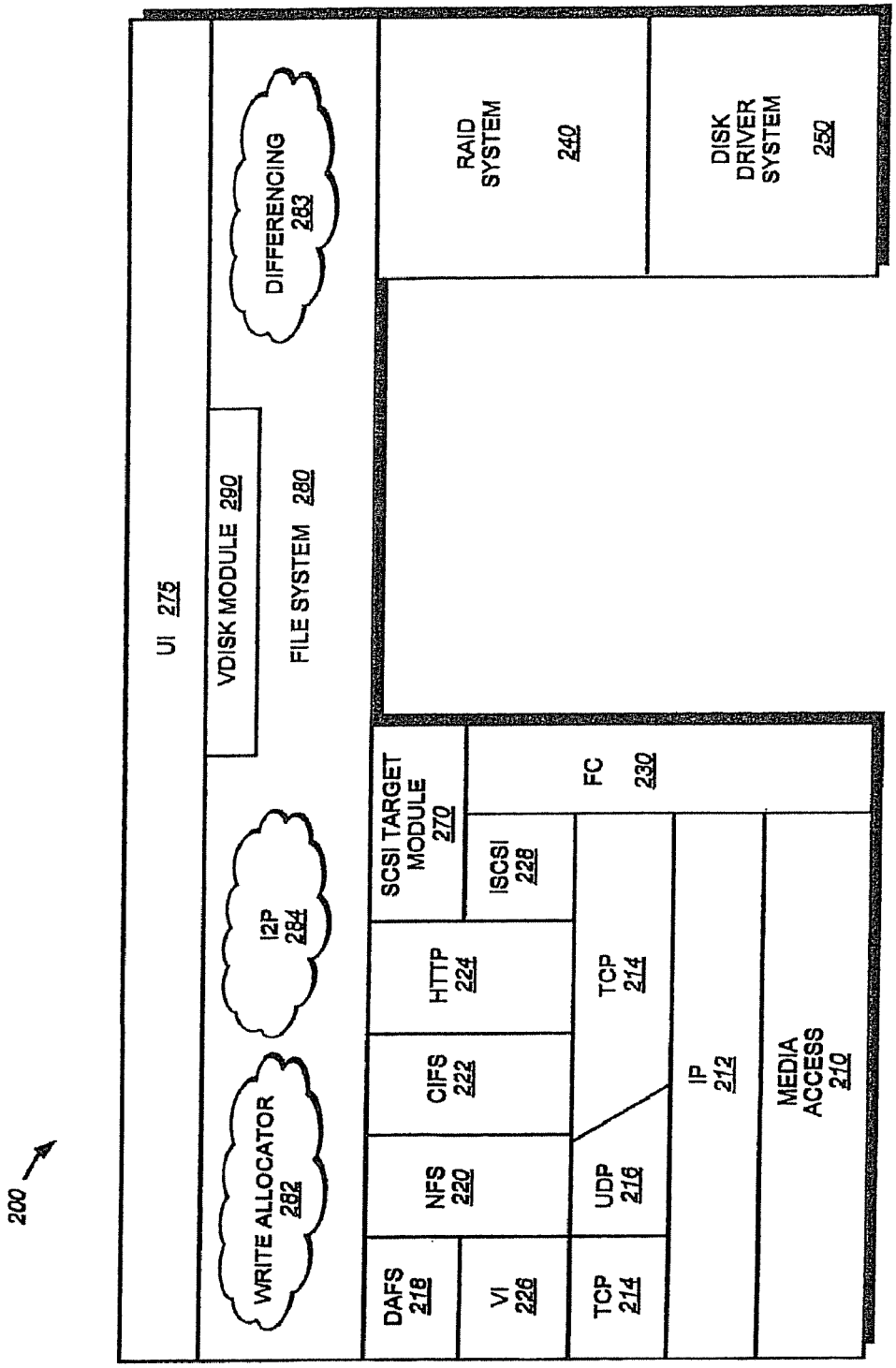
FIG. 2 is a schematic block diagram of a storage operating system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for, inter alia, the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 cooperates with the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. Volume information (volinfo) and file system information (fsinfo) blocks specify the layout of information in the file system, the latter block including an inode of a file that includes all other inodes of the file system (the inode file). Each logical volume (file system) has an fsinfo block that is preferably stored at a fixed location within, e.g., a RAID group. The inode of the fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as a packet over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in-core", i.e., in the buffer cache 170. If the information is not in the cache, the file system 280 indexes into the inode file using the inode number to access an appropriate entry and retrieve a logical volume block number (vbn). The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

Included in the storage operating system 200 is a set of inode to pathname (I2P) functions 284. The I2P functions 284, in conjunction with the file system 280, illustratively implement I2P mapping functionality. One exemplary technique for performing I2P mapping is described in U.S. patent application Ser. No. 11/156,679 entitled SYSTEM AND METHOD FOR MAINTAINING MAPPINGS FROM DATA CONTAINERS TO THEIR PARENT DIRECTORIES by Ed Zayas, et al.

The inode to pathname (I2P) functions enable the search agent to quickly identify the full pathname associated with a given inode. The file system 280 also includes a set of differencing processes 283. The differencing processes 283 implement PCPI differencing techniques. One example of PCPI differencing techniques is described in the above-incorporated U.S. Pat. No. 7,562,077, entitled METHOD AND APPARATUS FOR GENERATING AND DESCRIBING BLOCK-LEVEL DIFFERENCES INFORMATION ABOUT TWO SNAPSHOTS. However, it should be noted that in alternate embodiments additional and/or differing PCPI differencing techniques may be implemented in accordance with alternative embodiments of the present invention.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may implement file system semantics. In this sense, the ONTAP software is an example of such a storage operating system implemented as a microkernel and including the file system module to implement the write anywhere file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or storage appliance) or general-purpose computer, including a standalone computer or portion thereof, embodied as or including a storage system 120. An example of a storage appliance that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Volume Structure

The file system, such as the write-anywhere file system, maintains information about the geometry of the underlying physical disks (e.g., the number of blocks in each disk) in the storage system. The RAID system provides the disk geometry information to the file system for use when creating and maintaining the vbn-to-disk,dbn mappings used to perform write allocation operations. The file system maintains block allocation data structures, such as an active map, a space map, a summary map and snapmaps. These mapping data structures describe which blocks are currently in use and which are available for use and are used by a write allocator 282 of the file system 280 as existing infrastructure for the logical volume.

Specifically, the snapmap denotes a bitmap file describing which blocks are used by a snapshot. The write-anywhere file system (such as the WAFL file system) has the capability to generate a snapshot of its active file system. An "active file system" is a file system to which data can be both written and read or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. A PCPI can also include other information (metadata) about the active file system at the particular point in time for which the image is taken. The terms "PCPI" and "snapshot" may be used interchangeably through out this patent without derogation of Network Appliance's trademark rights.

The write-anywhere file system supports (maintains) multiple PCPIs that are generally created on a regular schedule. Each PCPI refers to a copy of the file system that diverges from the active file system over time as the active file system is modified. Each PCPI is a restorable version of the storage element (e.g., the active file system) created at a predetermined point in time and, as noted, is "read-only" accessible and "space-conservative". Space conservative denotes that common parts of the storage element in multiple snapshots share the same file system blocks. Only the differences among these various PCPIs require extra storage blocks. The multiple PCPIs of a storage element are not independent copies, each consuming disk space; therefore, creation of a PCPI on the file system is instantaneous, since no entity data needs to be copied. Read-only accessibility denotes that a PCPI cannot be modified because it is closely coupled to a single writable image in the active file system. The closely coupled association between a file in the active file system and the same file in a PCPI obviates the use of multiple "same" files. In the example of a WAFL file system, PCPIs are described in TR3002 *File System Design for a NFS File Server Appliance* by David Hitz et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz et al., each of which is hereby incorporated by reference as though full set forth herein.

The active map denotes a bitmap file describing which blocks are used by the active file system. As previously described, a PCPI may contain metadata describing the file system as it existed at the point in time that the image was taken. In particular, a PCPI captures the active map as it existed at the time of PCPI creation; this file is also known as the snapmap for the PCPI. Note that a snapmap denotes a bitmap file describing which blocks are used by a PCPI. The summary map denotes a file that is an inclusive logical OR bitmap of all snapmaps. By examining the active and summary maps, the file system can determine whether a block is in use by either the active file system or any PCPI. The space map denotes a file including an array of numbers that describes the number of storage blocks used in a block allocation area. In other words, the space map is essentially a logical OR bitmap between the active and summary maps to provide a condensed version of available "free block" areas within the vbn space. Examples of PCPI and block allocation data structures, such as the active map, space map and summary map, are described in U.S. Pat. No. 7,454,445, titled INSTANT SNAPSHOT, by Blake Lewis et al., which application is hereby incorporated by reference.

Figure 3:
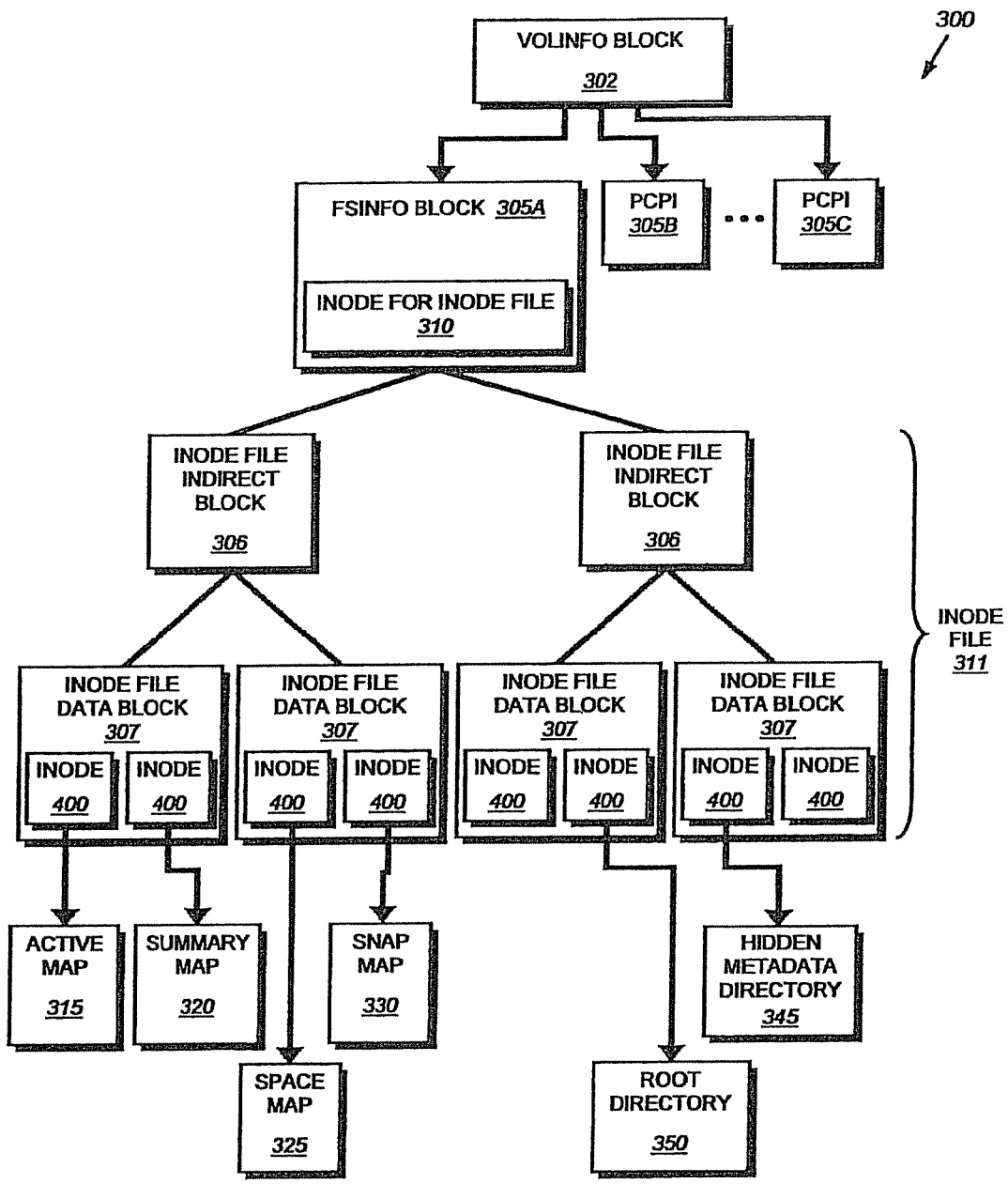
FIG. 3 is a schematic block diagram of an exemplary volume buffer tree in accordance with an embodiment of the present invention.

FIG. 3 is a schematic block diagram of an exemplary on-disk storage structure 300 of a volume of a storage system. As noted, a volume is typically associated with a file system and comprises data blocks organized within a vbn space. Each volume has a volinfo block that is preferably stored at a fixed location within, e.g., a RAID group. A volinfo block 302 is the root of the volume. The volinfo block contains pointers to one or more fsinfo blocks 305A, B, C. Fsinfo block 305A is associated with the active file system, while fsinfo blocks 305B, C may be associated with PCPIs of the volume. An example of PCPIs associated with a volinfo block 302 is described in U.S. Pat. No. 7,313,720, entitled TECHNIQUE FOR INCREASING THE NUMBER OF PERSISTENT CONSISTENCY POINT IMAGES IN A FILE SYSTEM, by Emily Eng, et al.

The fsinfo block 305A contains an inode for an inode file 310. All inodes of the write-anywhere file system are organized into the inode file 311. Like any other file, the inode of the inode file is the root of the buffer tree that describes the locations of blocks of the file. As such, the inode of the inode file 310 may directly reference (point to) data blocks 307 of the inode file 311 or may reference indirect blocks 306 of the inode file 311 that, in turn, reference data blocks of the inode file. In this example, the inode for the inode file 310 includes an exemplary buffer tree comprising a plurality of inode file indirect blocks 306 that, in turn, point to inode file data blocks 307. Within each data block of the inode file are inodes 400, each of which serves as the root of a file. Among the inodes of the inode file 310 are inodes for special metadata files, such as an active map 315, a summary map 320, a space map 325, a root directory 350 and a metadata directory 345. All user files in the file system are organized under the root directory 350, while various metadata files associated with the file system are stored under the metadata directory 345.

The inode file 311 includes the inode for every data container stored within the volume or file system. In accordance with the illustrative embodiment of the present invention, by performing a differencing process between the inode file 311 of a PCPI representing a first point in time and a PCPI representing a second point in time, the novel search agent 155 may quickly determine which, if any, inodes have been modified. That is, each PCPI contains an inode file identifying the contents of the PCPI. Those inodes that have been modified are then read to determine the new metadata, which is subsequently incorporated into the search database.

D. Inode Structure

Figure 4:
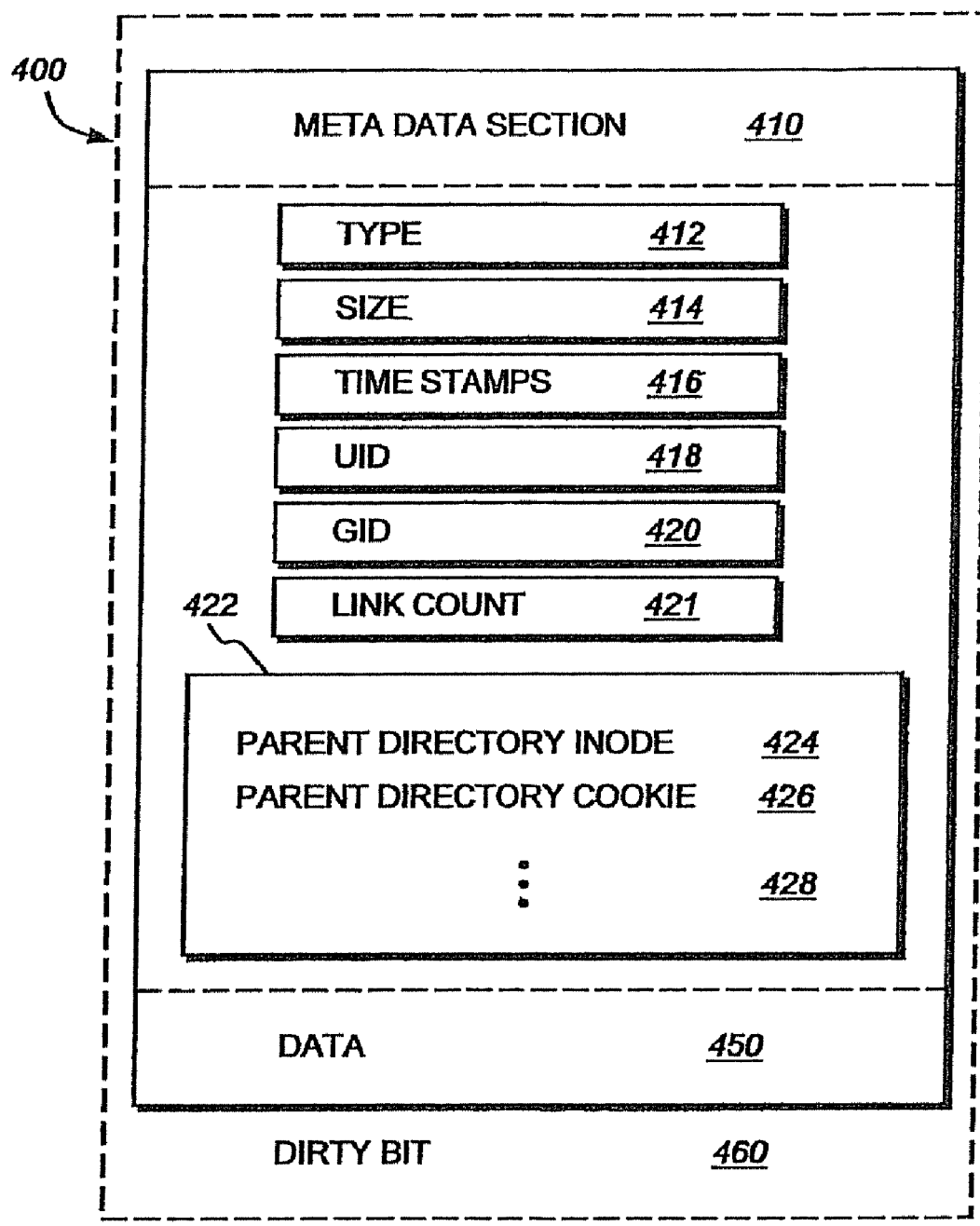
FIG. 4 is a schematic block diagram of an inode in accordance with an embodiment of the present invention.

In the illustrative embodiment, a data container, such as a file, is represented in the write-anywhere file system as an inode data structure adapted for storage on the disks 130. FIG. 4 is a schematic block diagram of an inode 400, which illustratively includes a metadata section 410 and a data section 450. The information stored in the metadata section 410 of each inode 400 describes the data container and, as such, includes the type (e.g., regular, directory, virtual disk) 412 of data container, the size 414 of the data container, time stamps (e.g., access and/or modification) 416 for the data container, ownership, i.e., user identifier (UID 418) and group ID (GID 420), of the data container, a link count field 421 and a novel primary name data structure 422. The link count field 421 tracks the number of names (and, implicitly, the number of hard links) associated with the inode. For example, a link value count of one signifies that there are no hard links to the data container and that the only name associated with the inode is the primary name.

The primary name data structure 422 illustratively contains I2P mapping information and, as such, includes a parent directory inode field 424, a parent directory cookie field 426 and, in alternative embodiments, additional fields 428. The parent directory inode field 424 contains an inode value that is associated with the parent directory of the data container. Thus, if the data container is a file bar located in the foo directory (i.e., /foo/bar) then the parent directory inode field contains the inode number of the foo directory. The parent directory cookie field 426 illustratively contains a multi-bit value that illustratively identifies a directory block and entry within the directory block of the directory identified by the parent directory inode field 424. I2P mapping information is further described in the above-referenced U.S. patent application Ser. No. 11/156,679, entitled SYSTEM AND METHOD FOR MAINTAINING MAPPINGS FROM DATA CONTAINERS TO THEIR PARENT DIRECTORIES, by Ed Zayas, et al. However, it should be noted that in alternate embodiments, different I2P mapping techniques may be utilized in accordance with the present invention. As such, the description of a primary name data field contained within an inode should be taken as exemplary only.

The contents of the data section 450 of each inode may be interpreted differently depending upon the type of data container (inode) defined within the type field 412. For example, the data section 450 of a directory inode contains metadata controlled by the file system, whereas the data section of a file inode contains file system data. In this latter case, the data section 450 includes a representation of the data associated with the file.

Specifically, the data section 450 of a regular on-disk inode may include file system data or pointers, the latter referencing 4 KB data blocks on disk used to store the file system data. Each pointer is preferably a logical vbn to facilitate efficiency among the file system and the RAID system 240 when accessing the data on disks. Given the restricted size (e.g., 192 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 450 of the inode (e.g., a second level inode) references an indirect block (e.g., a first level block) that illustratively contains 1024 pointers, each of which references a 4 KB data block on disk. For file system data having a size greater than 64 MB, each pointer in the data section 450 of the inode (e.g., a third level inode) references a double-indirect block (e.g., a second level block) that contains 1024 pointers, each referencing an indirect (e.g., a first level) block. The indirect block, in turn, that contains 1024 pointers, each of which references a 4 KB data block on disk. When accessing a file, each block of the file may be loaded from disk 130 into the buffer cache 170.

When an on-disk inode (or block) is loaded from disk 130 into buffer cache 170, its corresponding in-core structure embeds the on-disk structure. For example, the dotted line surrounding the inode 400 indicates the in-core representation of the on-disk inode structure. The in-core structure is a block of memory that stores the on-disk structure plus additional information needed to manage data in the memory (but not on disk). The additional information may include, e.g., a "dirty" bit 460. After data in the inode (or block) is updated/modified as instructed by, e.g., a write operation, the modified data is marked "dirty" using the dirty bit 460 so that the inode (block) can be subsequently "flushed" (stored) to disk. The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

E. Persistent Consistency Point Images (PCPIs)

As noted above, a file system (such as the WAFL file system) illustratively has the capability to generate a PCPI of its active file system. An "active file system" is a file system to which data can be both written and read, or, more generally, an active store that responds to both read and write I/O operations.

Figure 5:
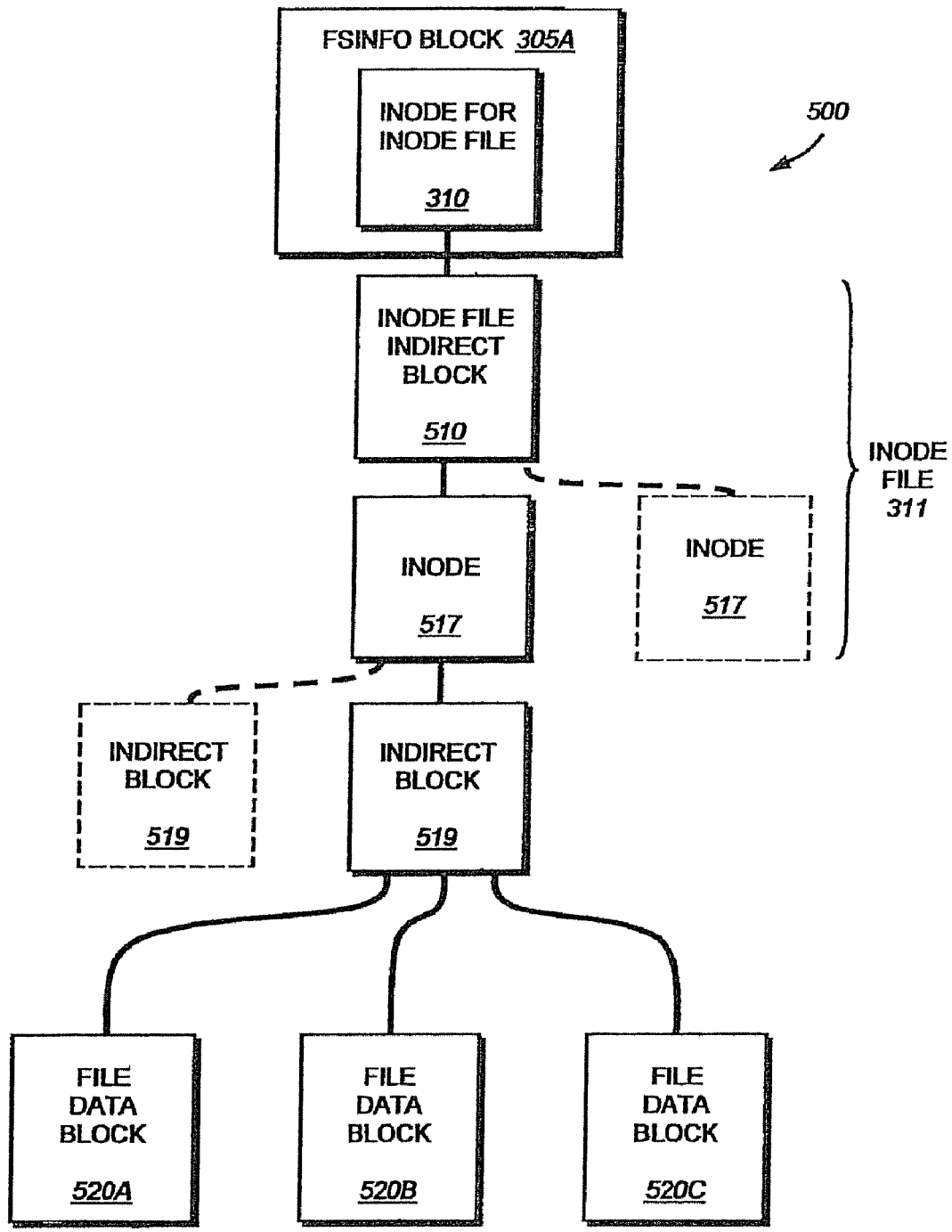
FIG. 5 is a schematic block diagram of an exemplary buffer tree in accordance with an embodiment of the present invention.

Broadly stated, a PCPI is stored on-disk along with the active file system, and is called into the memory of the storage system as requested by the storage operating system. The on-disk organization of the PCPI (snapshot) and the active file system can be understood from the following description of an exemplary file system inode structure 500 shown in FIG. 5. At the top level is an fsinfo block 305A that includes an inode for the inode file 310. The inode for the inode file 310 contains information describing the inode file associated with a file system. In this exemplary file system inode structure, the inode for the inode file 310 contains a pointer that references (points to) an inode file indirect block 510. The inode file indirect block 510 contains a set of pointers that reference inode file blocks, each of which contains an array of inodes 517, which, in turn, contain pointers to indirect blocks 519. The indirect blocks 519 include pointers to file data blocks 520A, 520B and 520C. Each of the file data blocks 520(A-C) is capable of storing, e.g., 4 KB of data.

Figure 6:
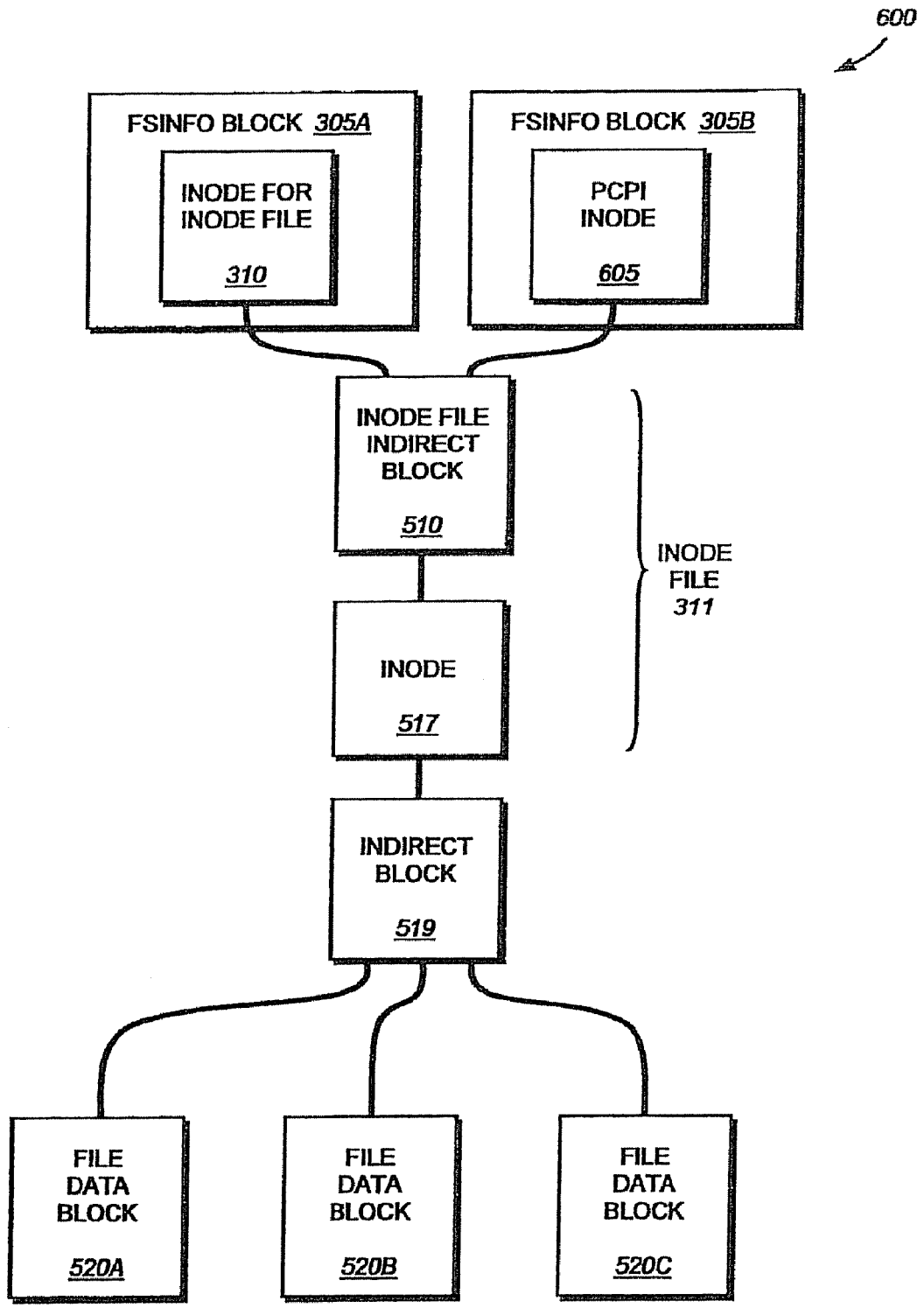
FIG. 6 is a schematic block diagram of an exemplary buffer tree showing a persistent consistency point file system information block in accordance with an embodiment of the present invention.
Figure 7:
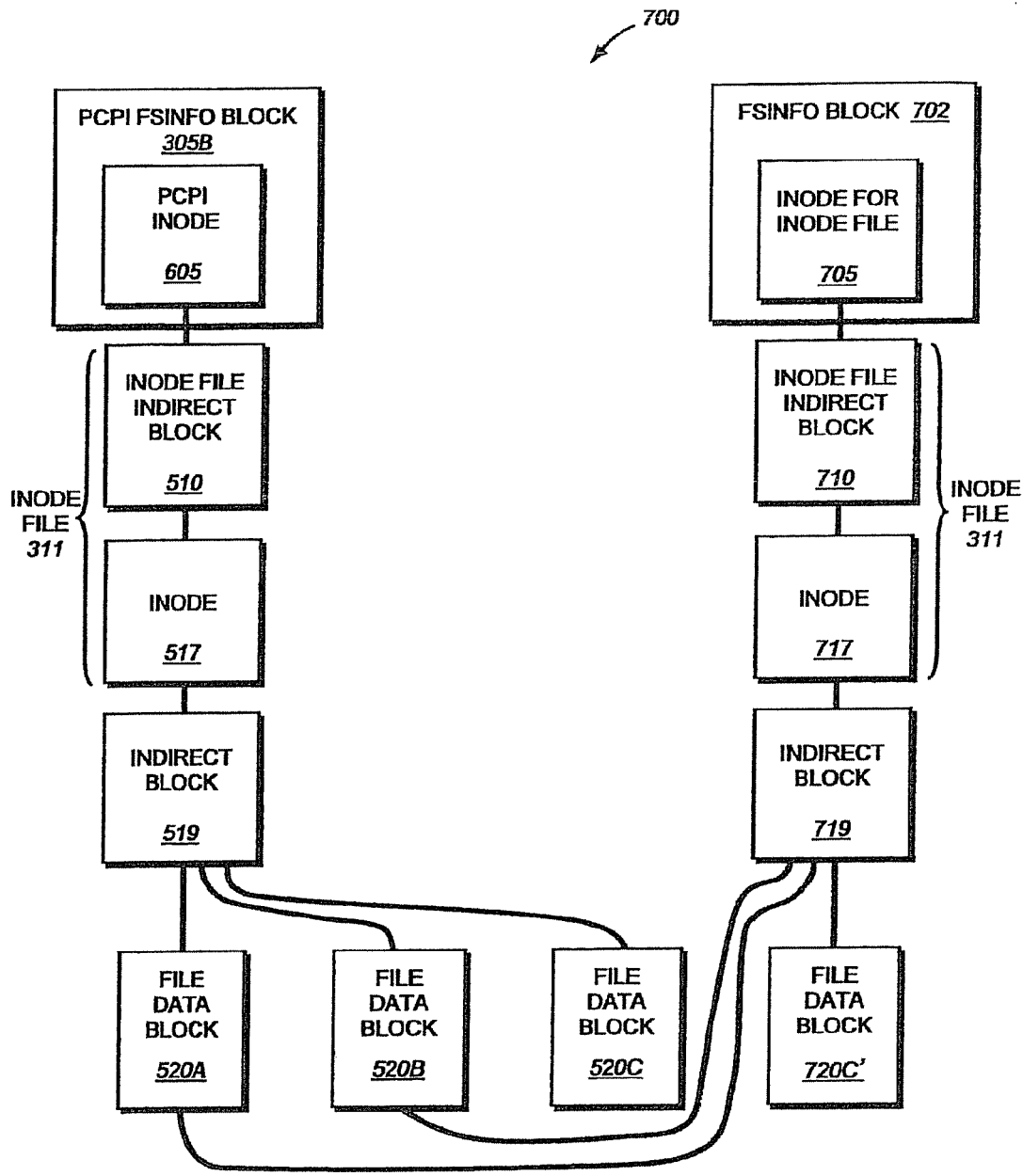
FIG. 7 is a schematic block diagram of an exemplary buffer tree showing modified data written in accordance with an embodiment of the present invention.

When the file system generates a PCPI of its active file system, a second fsinfo block 305B is generated as shown in FIG. 6. The second fsinfo block 305B includes a PCPI inode 605, which is, in essence, a duplicate copy of the inode for the inode file 310 of the file system inode structure 500 that shares common parts, such as inodes and blocks, with the active file system. As such, each PCPI includes the inode file at the point in time of the creation of the PCPI. For example, the exemplary file system structure 500 includes the inode file indirect blocks 510, inodes 517, indirect blocks 519 and file data blocks 520A-C as in FIG. 5. When a user modifies a file data block, the file system writes the new data block to disk and changes the active file system to point to the newly cremated block. FIG. 7 shows an exemplary inode file system structure 700 after a file data block has been modified. In this example, file data block 520C is modified to file data block 720C'. As a result, the contents of the modified file data block are written to a new location on disk as a function of the exemplary file system. Because of this new location, the indirect block 719 must be rewritten. Due to this changed indirect block 719, the inode 717 must be rewritten. Similarly, the inode file indirect block 710 and the inode for the inode file 705 must be rewritten within the fsinfo block 702.

Thus, after a file data block has been modified the PCPI inode 605 contains a pointer to the original inode file indirect block 510 which, in turn, contains pointers through the inode 517 and indirect block 519 to the original file data blocks 520A, 520B and 520C. The newly written indirect block 719 also includes pointers to unmodified file data blocks 520A and 520B. That is, the unmodified data blocks in the file of the active file system are shared with corresponding data blocks in the PCPI file, with only those blocks that have been modified in the active file system being different than those of the PCPI file.

However, the indirect block 719 further contains a pointer to the modified file data block 720C' representing the new arrangement of the active file system. A new inode for the inode file 705 is established representing the new structure 700. Note that meta-data (not shown) stored in any snapshotted blocks (e.g., 605, 510, and 520C) protects these blocks from being recycled or overwritten until they are released from all snapshots. Thus, while the active file system inode for the inode file 705 points to new blocks 710, 717, 719, 520A, 520B and 720C', the old blocks 605, 510 and 520C are retained until the snapshot is fully released.

F. Updating Metadata in A Network Attached Storage Environment

The present invention provides a system and method for accelerating update of a metadata search database using persistent consistency point image (PCPI) differencing. A search agent, which is illustratively a software module executing on a computer operatively interconnected with one or more storage systems, generates and maintains the metadata search database. In a network attached system (NAS) environment, the metadata search database illustratively comprises a database of metadata relating to data containers within a particular volume (or file system) associated with each storage system. Alternately, in a storage area network (SAN) environment, the search database comprises a database of metadata relating to data containers stored within a file system overlaid onto an exported logical unit number (lun) stored within the storage system. In such a SAN environment, the storage system may export the lun to a client, which organizes the exported lun in accordance with a client file system. The client file system is overlaid (stored) on the exported lun by the client. In either case, the metadata search database may be queried by clients of each storage system Specifically, in the example of the NAS environment, the search agent first initiates generation of a PCPI of the file system. The search agent then serially reads the inode file to initially populate the search database. At regular intervals thereafter, the search agent initiates generation of another PCPI of the volume. The regular interval may be user adjusted, e.g., every couple of minutes, every hour, etc., to enable tuning of the storage system, i.e., if data is rapidly changing, then the interval would be set to a shorter period of time than if the data is stored for long term archival purposes. Notably, the search agent utilizes a PCPI differencing technique to quickly identify any changes in the metadata associated with inodes stored within the volume. Any identified changes are written to a log file stored on the storage system. Once the differencing technique has completed, the search agent reads the log file and updates the search database, thereby moving the search database to a consistent state with the file system.

Figure 8:
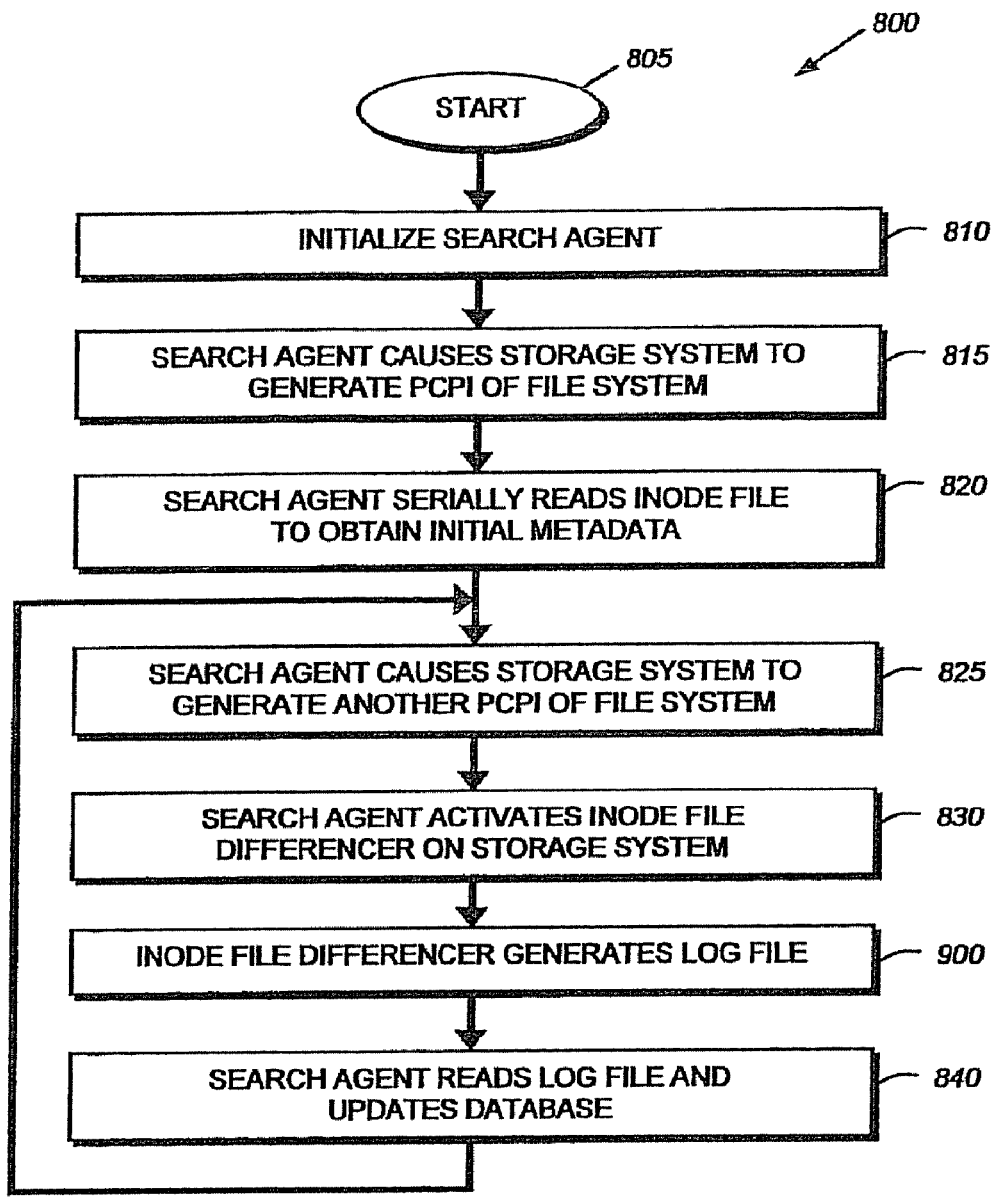
FIG. 8 is a flowchart detailing the steps of a procedure for generating and updating a metadata search database using persistent consistency point image differencing in accordance with an embodiment of the present invention.

FIG. 8 is a flowchart detailing the steps of a procedure 800 for initializing and updating metadata for a file system used in a NAS environment. The procedure 800 begins in step 805 and continues to step 810 where the search agent is initialized. Initialization may be triggered by, for example, the original installation of the search agent in a storage system environment or by configuration of the search agent to begin indexing and cataloging a database of metadata for the file system. In response to such initialization, the search agent, in step 815, causes the storage system to generate a PCPI of the file system by, for example, sending a remote procedure call (RPC) to the storage system. The search agent then serially reads the inode file of the PCPI of the file system to obtain the initial metadata in step 820. The metadata is then stored in the search database managed by the search agent.

Once the initial database has been populated, the search agent causes the storage system, at regular intervals, to generate another PCPI of the file system in step 825. As noted above, these PCPIs may be caused by the search agent sending RPCs to the storage system. Once the PCPI of the file system has been generated, the search agent, in step 830, activates an inode file differencer on the storage system. Illustratively, the inode file differencer is implemented by the differencing processes 283 within the file system. However, in alternate embodiments, inode file differencing may be performed by other modules, including, for example, the file system and/or the search agent. As such, the description of the inode file differencer being the differencing processes 283 should be taken as exemplary only.

In response, the inode file differencer generates the appropriate log file 1000 (FIG. 10) in step 900, described below in reference to FIG. 9. The log file illustratively comprises metadata that has been changed so that the search agent may update the search database. In step 840, the search agent reads the log file and updates the search database before the procedure returns to step 825. It should be noted that while this description is written in terms of inode file differencing being performed by the storage system using the technique described below in reference to procedure 900, the teachings of the present invention may be utilized with any suitable technique for rapidly differencing changes within the inode file, i.e., techniques faster than performing a file system crawl. Such techniques typically include pointer comparisons instead of full data comparisons, etc. As such, the description of the using procedure 900 to generate the log file should be taken as exemplary only.

Figure 9:
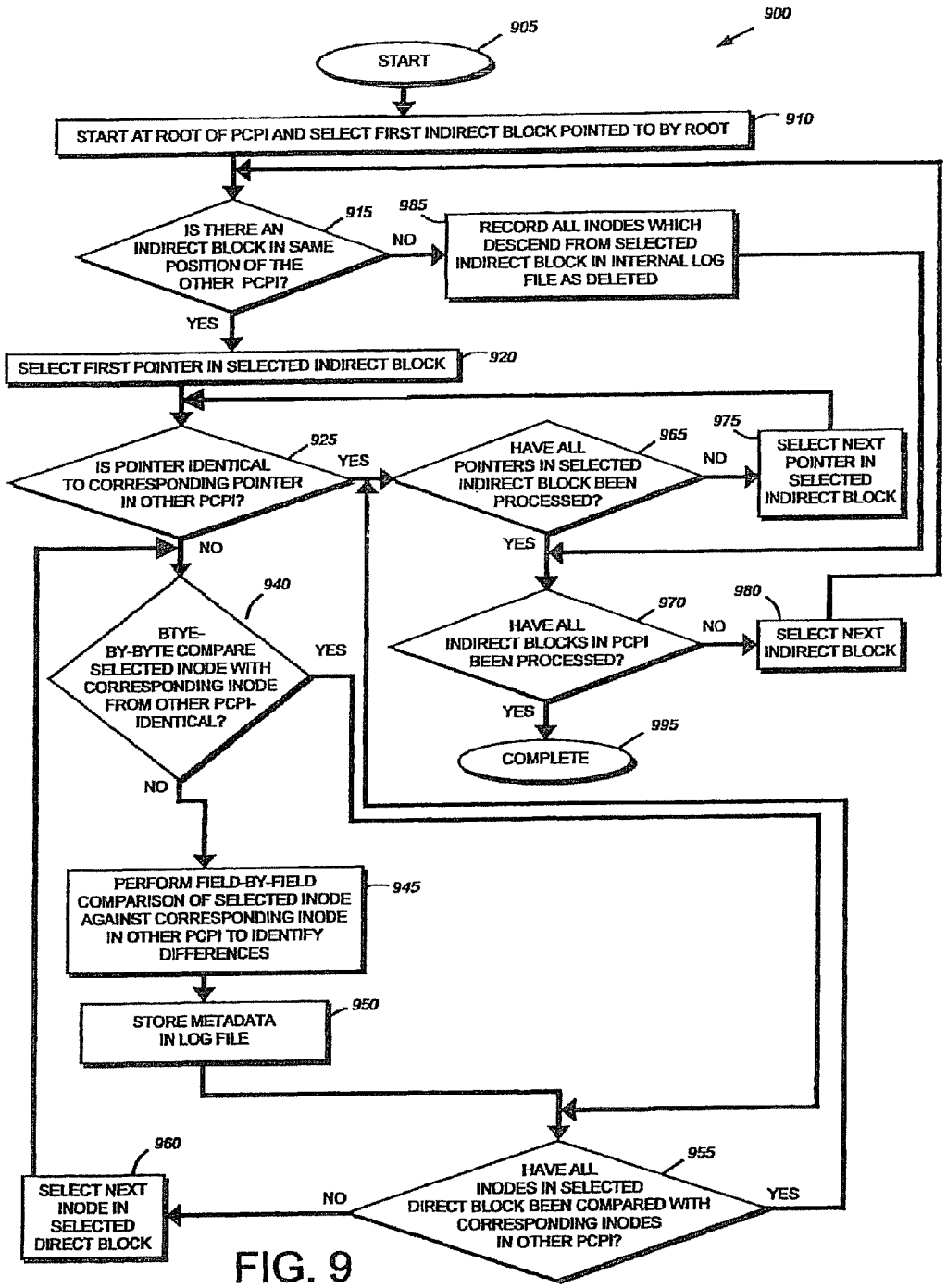
FIG. 9 is a flowchart detailing the steps of a procedure for performing persistent consistency point image differencing in accordance with an embodiment of the present invention.

FIG. 9 is a flowchart detailing the steps of a procedure 900 for performing inode file differencing in accordance with an illustrative embodiment of the present invention. Broadly stated, the procedure 900 identifies differences in the inode files between two PCPIs. In the illustrative embodiment, procedure 900 is performed by differencing processes 283; however, in alternate embodiments, the differencing procedure 900 may be performed by other modules.

The procedure 900 begins in step 905 and continues to step 910 where the differencing processes start at the root of the first PCPI and select the first indirect block pointed to (referenced) by the root inode of the first PCPI. In step 915, the differencing processes determine if there is an indirect block in the same position in the second PCPI. If there is no corresponding indirect block in the second PCPI, all inodes which descend from the selected indirect block were deleted after the first PCPI was acquired. In that case, the procedure advances to step 985 where the differencing processes record that all inodes which descend from the selected indirect block as deleted. The procedure then continues to step 970 where the differencing processes determine whether all indirect blocks in the PCPI have been processed. If so, the procedure completes in step 995. If there are additional indirect blocks to be processed, the procedure branches to step 980 where a next indirect block in the first PCPI is selected before the procedure loops back to step 915.

If, in step 915, it is determined that there is an indirect block in the same position in the other PCPI, the procedure continues to step 920 where the differencing processes select the first pointer in the selected indirect block and, in step 925, determine whether the selected pointer is identical to a corresponding pointer in the second PCPI. If the pointer is identical, the branches to step 965 where the differencing processes determine whether all pointers in the selected indirect block have been processed. If not, the procedure branches to step 975 where the differencing processes select a next pointer in the selected indirect block before the procedure loops back to step 925. However, if all of the pointers in the selected indirect block have been processed, the procedure then branches to step 970 and continues as described above.

If, in step 925 it is determined that the pointer is not identical to a corresponding pointer in the other PCPI, the differencing processes identify the corresponding direct block of the inode file pointed to by the selected pointer and select an inode in the selected direct block before performing a byte-by-byte comparison of the selected inode in the first PCPI with a corresponding inode in the second PCPI to determine if they are identical in step 940. If they are identical, the procedure branches to step 955 where the differencing processes determine whether all inodes in the selected direct block have been compared with the corresponding inodes in the other PCPI. If so, the procedure branches to step 965 where the differencing processes continue processing pointers in the selected indirect block as described above. If there are additional inodes to be processed, the procedure branches to step 960 where the differencing processes select a next inode in the selected direct block before the procedure loops back to step 940.

If, in step 940, it is determined that the selected inode is not identical with the corresponding inode in the second PCPI, then the differencing processes perform a field-by-field comparison of the selected inode and the corresponding inode to identify which fields have been modified in step 945. Once the modified fields have been identified, the differencing processes, in step 950, store the metadata that has been modified in the log file in step 950 and the procedure continues to step 955.

Figure 10:
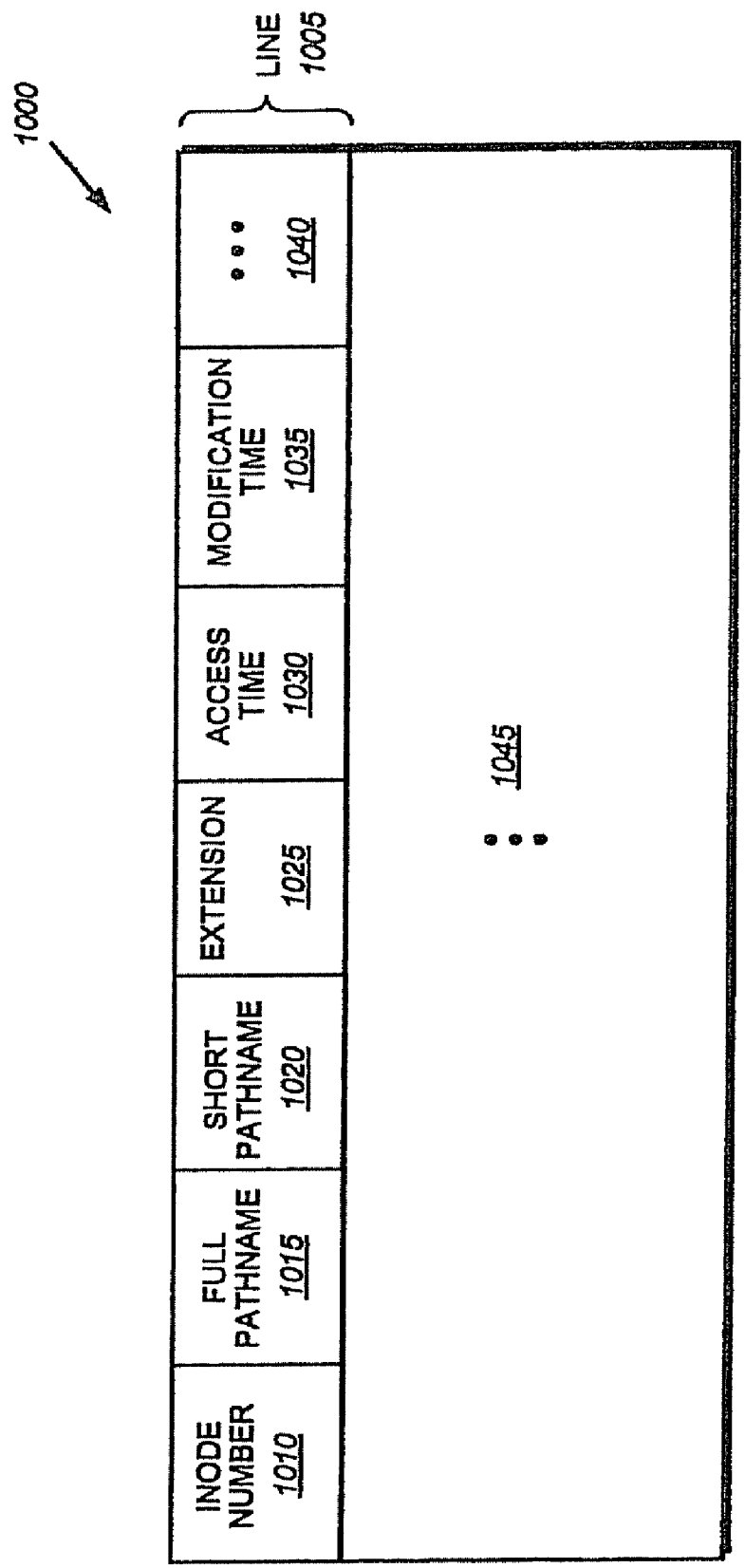
FIG. 10 is a schematic block diagram of an exemplary log file in accordance with an embodiment of the present invention.

FIG. 10 is a schematic block diagram of an exemplary log file 1000 utilized in accordance with an embodiment of the present invention. Illustratively, the log file is a text file created by the differencing processes, described above, or by the search agent, described further below, to store changes in metadata before the database is updated. Illustratively, the log file 1000 comprises one or more lines 1005 of data. Each line 1005 illustratively comprises an inode number field 1010, a full pathname field 1015, a short pathname field 1020, an extension field 1025, an access time field 1030, a modification time field 1035 and, in alternate embodiments, additional fields 1040. It should be noted that the types of metadata stored in the log file are for illustrative purposes only, and that the teachings of the present invention may be utilized with a file system configured to store various types of metadata. As such, the illustrative log file 1000 described herein should be taken as exemplary only.

The inode number field 1010 contains an inode number identifying the data container to which this metadata applies. The full pathname field 1015 contains the full pathname of the data container including any directories associated therewith. The short pathname field 1025 contains the name of the data container absent any directories. The extension field 1025 contains the extension of the data container name. For example, in a conventional 8×3 naming schematic, the three characters after the period comprises data container's extension. By indexing data container extensions, the search agent may respond to requests such as requests to identify the largest files having a particular extension without necessarily examining the data itself. The access time and modification time fields 1030, 1035, contain a time value indicative of the most recent time that the data container was access and/or modified.

G. Updating Metadata in a Storage Area Network Environment

In the example of the SAN environment, the search agent first causes the storage system to generate a PCPI of the volume storing the exported lun. Illustratively, the exported lun has New Technology File System (NFTS) overlaid thereon by a client of the storage system. The search agent performs an initial analysis of the contents of the exported lun by accessing the exported lun via a file level protocol available through the storage system. The search agent reads the records stored within a master file table (MFT) of a client file system and populates the search database with the metadata stored within the various records. At regular intervals thereafter, the search agent initiates generation of another PCPI of the volume containing an exported lun. Using the file level protocol, the agent reads the appropriate journal entries stored within the client file system to determine which, if any, journal entries must be replayed to bring the MFT to a consistent state. The search agent then retrieves each record from the MFT and compares a logical sequence number (LSN) stored therein with the LSN stored within the MFT record of the previous PCPI. If both LSNs are identical, then no change in metadata has occurred for the data container associated with the record. However, if the LSNs differ, then metadata has been modified. In such a case, the search agent causes the metadata to been written to a log entry within the log file. Once all of the records within the MFT have been examined, the search agent reads the log file and updates the search database accordingly.

Figure 11:
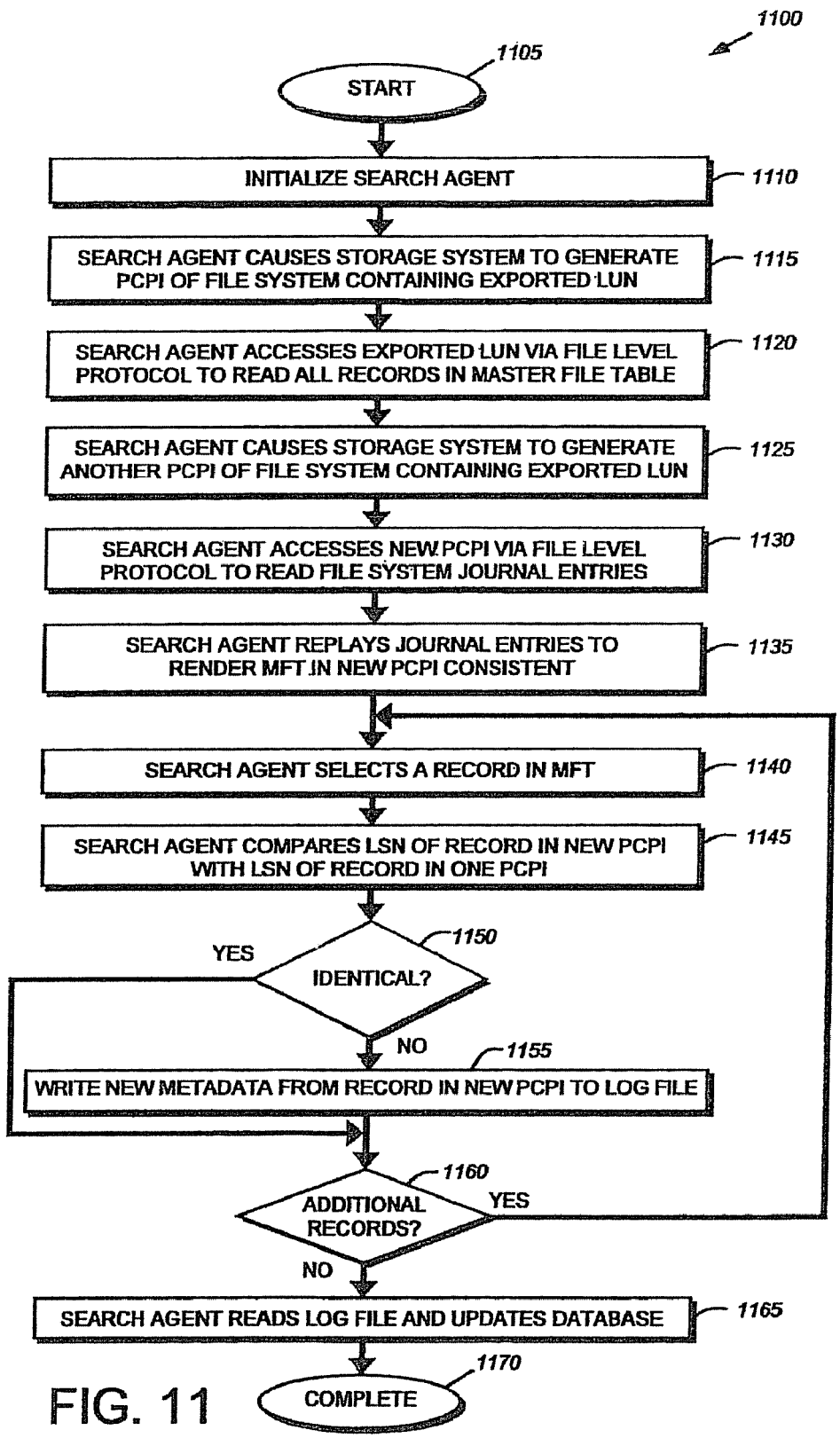
FIG. 11 is a flowchart detailing the steps of a procedure for creating and updating a metadata search database for a file system overlaid onto an exported logical unit number in accordance with an embodiment of the present invention.

FIG. 11 is a flowchart detailing the steps of a procedure 1100 for rapidly updating metadata of data container stored on a file system overlaid onto an exported logical unit number (lun) managed by a storage system (a "client file system"). Illustratively, the client file system is New Technology File System (NTFS) available from Microsoft Corp. of Redmond, Wash. However, the teachings of the present invention may be utilized with any applicable client file system that utilizes well-known offsets to track inodes or equivalent data constructs. As such, the description of NTFS, MFTs and records therein, as described further below, should be taken as exemplary only. The procedure 1100 begins in step 1105 and continues to step 1110 where the search agent is initialized. As noted above, initialization may be triggered by installation of the search agent or configuration of the search agent to create a database for this particular data set. In step 1115, the search agent causes the storage system to generate a PCPI of the file system containing the exported lun. This PCPI may be generated by the search agent sending a RPC to the storage system, thereby causing the storage system to generate the PCPI. In step 1120, the search agent accesses the exported lun via a file level protocol, such as, e.g., NFS, to read all of the records in the MFT. As the client file system utilizes a well-known layout, the search agent may compute appropriate offsets into the client file system by accessing appropriate locations of the exported lun.

Illustratively, the storage system enables access to the exported lun as a file via a file level protocol such as NFS. Such dual-inode access is further described in U.S. Pat. No. 7,383,378, entitled SYSTEM AND METHOD FOR SUPPORTING FILE AND BLOCK ACCESS TO STORAGE OBJECT ON A STORAGE APPLIANCE by Vijayan Rajan, et al, the contents of which are hereby incorporated by reference. By reading all of the records in the MFT, the search agent may initially populate the database for this particular overlaid file system. Then, at regular intervals, the search agent causes, the storage system to generate another PCPI of the file system containing the exported lun in step 1125. The search agent accesses the new PCPI via a file-level protocol to read any file system journal entries in step 1130 and replays the journal entries to render the MFT in the new PCPI consistent in step 1135. In step 1140, the search agent then selects a record in the MFT. The search agent compares the logical sequence number (LSN) of the selected record in the new PCPI with the LSN of the identical record in the old PCPI in step 1145 and determines whether they are identical in step 1150. If they are identical, then the procedure branches to step 1160 where the search agent determines whether there are additional records in the MFT to be read. If there are additional records, the procedure loops back to step 1140 where the search agent selects a new record. If there are no additional records to be read, the procedure continues to step 1165 where the search agent reads the log file and updates the database before the procedure completes in step 1170.

However, if in step 1150, it is determined that the LSN is different between the new and old PCPIs, the procedure continues to step 1155 where the search agent writes the new metadata from the record in the new PCPI to the log file. The procedure then continues to step 1160 as described above.

It should be noted that the acquisition of metadata stored within a file system overlaid onto a lun may be performed by the file system itself. In such an environment the storage operating system is capable of analyzing the contents of the overlaid file system.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise the scope of the invention. Therefore, it is the object of the appended claims to cover all such variations and modifications as come within the true spirit and scope of the invention.

What is claimed is:

1. A method for maintaining a database of metadata, comprising:
   generating a first persistent consistency point at a first time;
   generating a second persistent consistency point at a second time;
   performing, by a processor of a data storage system, a differencing process to identify differences in inode files of the first persistent consistency point and the second persistent consistency point by comparing pointers of indirect blocks of the first persistent consistency point with pointers of indirect blocks of the second persistent consistency point to identify a changed set of metadata between the first time and the second time, wherein the differencing process comprises:

selecting a first indirect block of the first persistent consistency point and determining if a corresponding indirect block is located at a same position in the second persistent consistency point; and in response to determining that the corresponding indirect block is located at the same position in the second persistent consistency point, comparing pointers associated with the first indirect block of the first persistent consistency point and pointers associated with the corresponding indirect block of the second persistent consistency point to obtain the set of changed metadata; and updating the database of metadata using the changed set of metadata.

2. The method of claim 1 wherein the differencing process further comprises:

in response to updating the database of metadata using the changed set of metadata, performing the differencing process on all remaining indirect blocks of the first persistent consistency point; and in response to determining that the corresponding indirect block is not located at the same position in the second persistent consistency point, performing the differencing process on all remaining indirect blocks of the first persistent consistency point.

3. The method of claim 1 wherein generating the first persistent consistency point further comprises flushing all data write requests to persistent storage to generate a new version of data stored in the data storage system and generating new metadata with pointers addressing the new version of the data stored in the data storage system.

4. The method of claim 1 further comprising writing the changed set of metadata to a log file.

5. The method of claim 4 further comprising reading the log file by a search agent to update the database of metadata.

6. The method of claim 1 wherein the differencing process further comprises comparing sequence numbers of records in a client file system overlaid onto a data container stored in the data storage system.

7. The method of claim 6 wherein the data container comprises a virtual disk.

8. The method of claim 6 wherein the client file system comprises NTFS.

9. A system to maintain a database of metadata, comprising:

a search agent configured to cause a storage system, comprising a processor and a memory, to generate a first persistent consistency point at a first time and a second persistent consistency point at a second time;

a differencing processor configured to: compare first pointers associated with indirect blocks of the first persistent consistency point and second pointers associated with indirect blocks of the second persistent consistency point to identify a changed set of metadata between the first time and the second time, wherein the comparison is performed when an indirect block of the second persistent consistency point is located in a same position as an indirect block in the first persistent consistency point; and the search agent further configured to update the database of metadata using the changed set of metadata.

10. The system of claim 9, wherein the storage system is further configure to flush, during generation of the first persistent consistency point, all data write requests to persistent storage to generate new version of data stored in the storage system and to generate a new metadata with pointers addressing the new version of the data stored in the storage system.

11. The system of claim 9 wherein the differencing processor is further configured to generate a log file containing the changed set of metadata.

12. The system of claim 11 wherein the search agent is further configured to read the log file to update the database of metadata.

13. The storage system of claim 9 wherein the differencing processor is further configured to compare sequence numbers of records in a client file system overlaid onto a data container stored on the storage system.

14. The method of claim 13 wherein the data container comprises a virtual disk.

15. The method of claim 13 wherein the client file system comprises NTFS.

16. A computer readable medium containing executable program instructions executed by a processor, comprising:

program instructions that generate a first persistent consistency point of a storage system at a first time;

program instructions that generate a second persistent consistency point of the storage system at a second time;

program instructions that perform a differencing process to identify differences in inode files of the first persistent consistency point and the second persistent consistency point by comparing pointers of indirect blocks of the first persistent consistency point with pointers of indirect blocks of the second persistent consistency point to identify a changed set of metadata between the first time and the second time, wherein the differencing process comprises:

program instructions that select a first indirect block of the first persistent consistency point and determines if a corresponding indirect block is located at a same position in the second persistent consistency point; and program instructions that compare pointers associated with the first indirect block of the first persistent consistency point and pointers of the corresponding indirect block associated with the second persistent consistency point to obtain the set of changed metadata, in response to determining that the corresponding indirect block is located at the same position in the second persistent consistency point; and program instructions that update a database of metadata using the changed set of metadata.

17. The computer readable medium of claim 16 wherein the program instructions that perform the differencing process further comprise:

program instructions that compare, in response to updating the database of metadata using the changed set of metadata, the pointers in the first persistent consistency point and the pointers in the second persistent consistency point to obtain the set of changed metadata, and then perform the differencing process on all remaining indirect blocks of the first persistent consistency point; and program instructions that perform, in response to determining that the corresponding indirect block is not located at the same position in the second persistent consistency point, the differencing process on all remaining indirect blocks of the first persistent consistency point.

18. A method for maintaining a database of metadata, comprising:
- generating a first persistent consistency point at a first time;
- generating a second persistent consistency point at a second time;
- performing, by a processor of a data storage system, a differencing process that compares a first hierarchy of identifiers associated with the first persistent consistency point with a second hierarchy of identifiers associated with the second persistent consistency point to identify a changed set of metadata between the first time and the second time, wherein the comparison is performed in response to an indirect block of the second persistent consistency point being located in a same position as an indirect block of the first persistent consistency point; and
- updating the database of metadata using the changed set of metadata.

19. The method of claim 18 wherein the first hierarchy of identifiers is at least a pointer of an indirect block, bytes of a selected inode associated with the pointer of the indirect block, and a field of the selected inode associated with the pointer of the indirect block.

* * * * *

UNITED STATES PATENT AND TRADEMARK OFFICE
CERTIFICATE OF CORRECTION

Page 1 of 1

PATENT NO.        : 7,962,528 B1
APPLICATION NO.   : 12/707722
DATED             : June 14, 2011
INVENTOR(S)       : Pasupathy It is certified that error appears in the above-identified patent and that said Letters Patent is hereby corrected as shown below:

Col. 13, line 62 should read: "changes the active file system to point to the newly ~~cremated~~ created"

Col. 18, line 9 should read: "Such dual ~~inode~~mode access is further described in U.S. Pat. No."

Signed and Sealed this

Thirteenth Day of September, 2011

David J. Kappos
*Director of the United States Patent and Trademark Office*